March 12, 1935. J. C. WOBENSMITH 1,994,059
SAFETY DEVICE FOR MOTION PICTURE PROJECTORS
Filed July 14, 1931 2 Sheets-Sheet 1

Inventor
Jas. C. Wobensmith

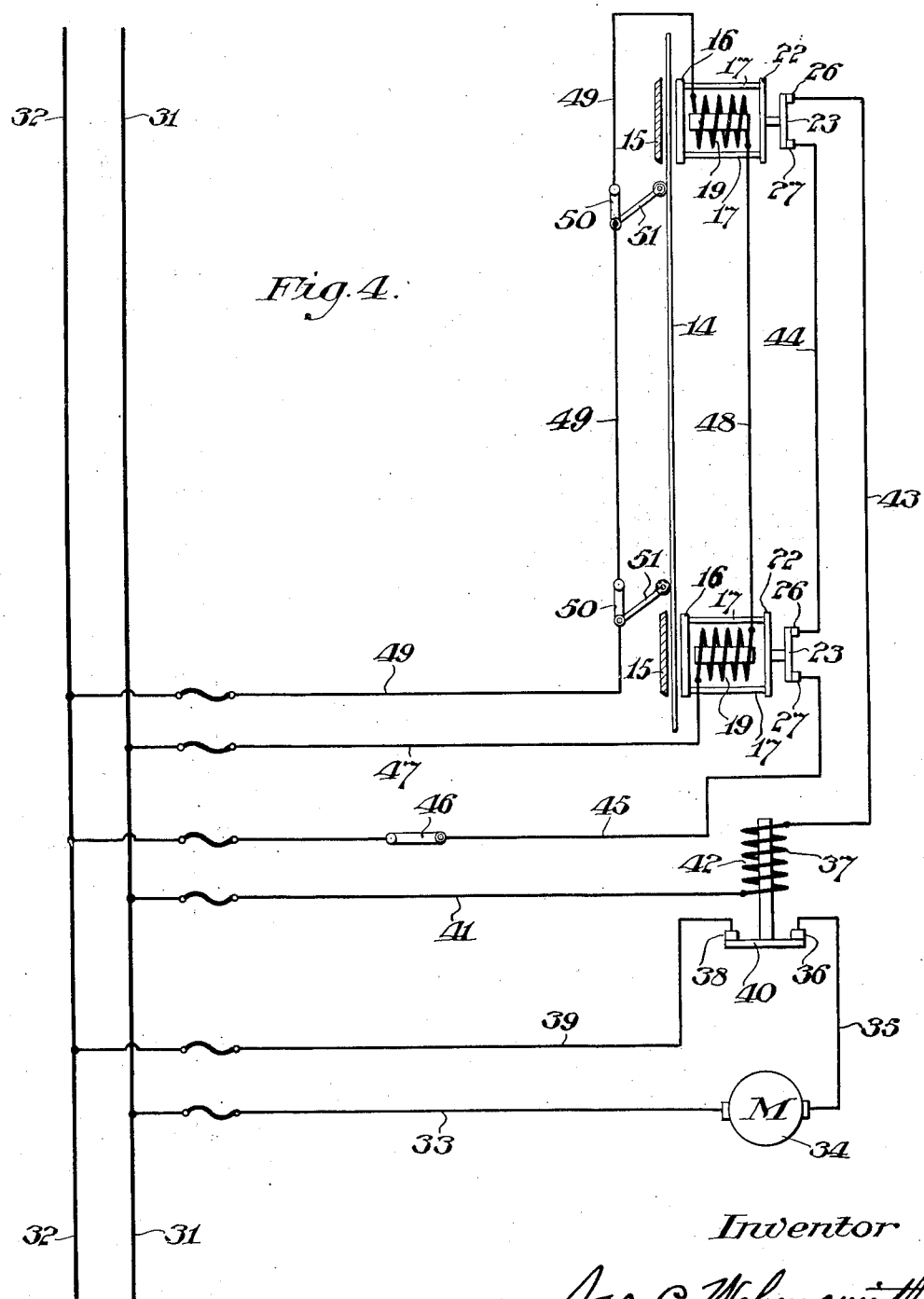

UNITED STATES PATENT OFFICE 1,994,059

SAFETY DEVICE FOR MOTION PICTURE PROJECTORS

James C. Wobensmith, Philadelphia, Pa.

Application July 14, 1931, Serial No. 550,695

6 Claims. (Cl. 88—17)

My invention relates to safety devices for motion picture projectors, and it relates more particularly to improved fire extinguishing means adapted to be mounted adjacent the reel magazines of such machines.

The principal object of my invention is to provide improved means adapted to be mounted adjacent the reel magazines of motion picture projectors, whereby, in the event of the film catching fire, as it frequently does when exposed unduly to the heat of the lamp, the fire will be confined to the exposed portion of the film, and will be prevented from reaching the main body thereof.

A further object of my invention is to provide a device adaptable for the purposes aforesaid, which will also serve to stop the motor in the event of the film breaking or catching fire between the magazines.

A further object of my invention is to provide a device adaptable for the purposes aforesaid, which will be simple, efficient and certain in its action, which may be used on existing types of motion picture projection machines, which will not interfere with the threading of the film through the projection machine when the reels are changed, and which will not mar the surface of the film when the same is passing therethrough.

The nature and characteristic features of my invention will be more readily understood from the following description, taken in connection with the accompanying drawings forming part hereof, in which:

Fig. 4 is a diagram of one form of an electrical circuit which may be employed in connection with the device shown in Figs. 1, 2, and 3.

It will of course be understood that the description and drawings herein contained are illustrative merely, and that various changes and modifications may be made in the structure disclosed without departing from the spirit of my invention.

Figure 1:
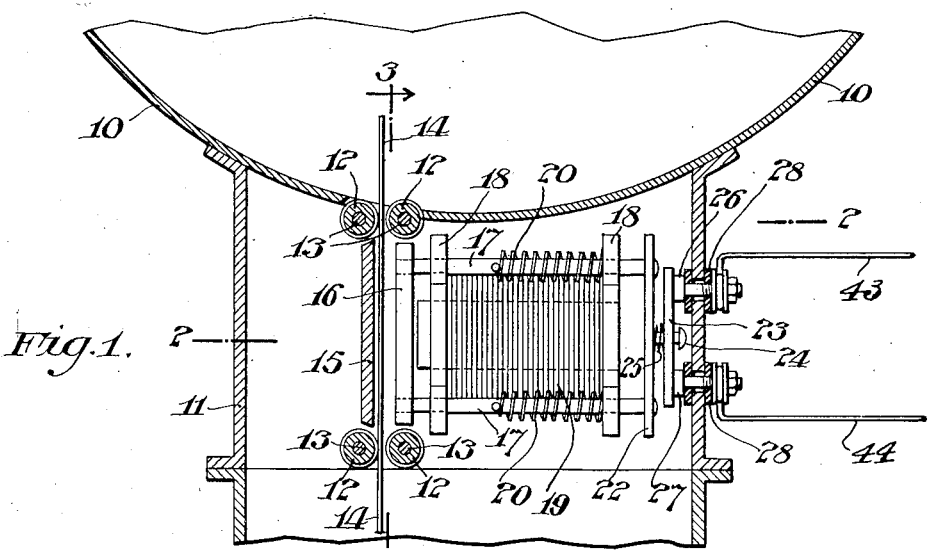
Figure 1 is a vertical sectional view of a portion of a motion picture machine adjacent one of the film magazines, a device embodying the main features of my invention being illustrated in connection therewith, the same being shown partly in section and partly in elevation.
Figure 2:
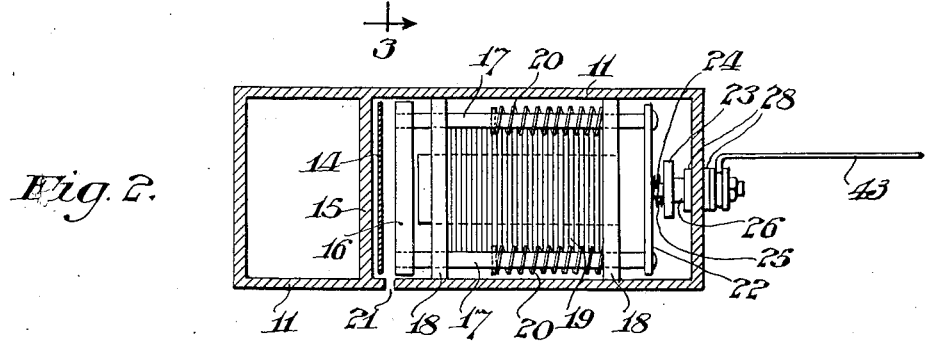
Fig. 2 is a horizontal section thereof, taken approximately on the line 2—2 of Fig. 1.
Figure 3:
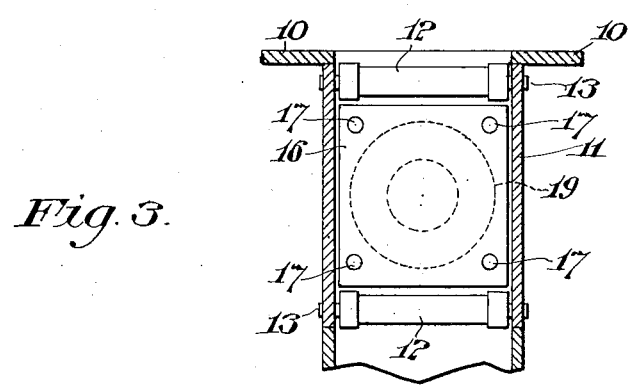
Fig. 3 is a vertical section thereof, taken approximately on the line 3—3 of Fig. 1.

Referring now more particularly to Figs. 1 to 3 of the drawings, 10 is a portion of the reel magazine of a motion picture projection machine, to which the housing 11, of a device embodying the main features of my present invention, is attached in any suitable manner.

Guide rollers 12 are journaled in the housing 11, by means of shafts 13. The guide rollers 12 are arranged in pairs, at the top and bottom of the housing 11, and serve to guide the film 14 in front of a plate 15, so that the surface of the film will normally be held away from the surface of the plate 15.

The guide rollers 12 have their central portions reduced in diameter, so that only the larger ends of said rollers will engage the film 14, and only on that portion of the same which contains no pictures, thus avoiding any possibility of the rollers marring the picture surface of the film.

Arranged adjacent the plate 15 is another plate 16, which is preferably made of magnetic material, such as soft iron. The plate 16 is carried at the front end of a series of rods 17, which are slidably mounted in the flanges 18 of an electromagnetic coil 19. Springs 20 are mounted on the rods 17, and tend to impel the rods forwardly, and consequently to impel the plate 16 toward the plate 15.

It will, of course, be understood that when the coil 19 is energized by the passage of an electrical current therethrough, the plate 16 will be held retracted against the tension of the springs 20, and in this position the plate 16 will be free from contact with the passing film 14.

One of the side walls of the housing 11 is slotted, as at 21, to permit the film to be more conveniently threaded through the safety device, and this slot is so located as to be closed by the plate 16 when the same is released by the deenergization of the coil 19, so that when the plate 16 is in the position to grip the film 14, the film will be entirely enclosed, not only on the surfaces of the portion thereof which is between the plates 15 and 16, but also at the edges.

The rear ends of the rods 17 carry a yoke 22, preferably made of an insulating material such as vulcanized fiber. A contact bar 23 is carried by the yoke 22, preferably by means of pins 24, which permit a limited range of movement of the contact bar 23 with respect to the yoke 22. Springs 25 are interposed between the contact bar 23 and the yoke 22.

The contact bar 23 is adapted, when the plate is retracted by the energization of the coil 19, to establish an electrical contact between the heads of the contact members 26 and 27. The contact members 26 and 27 are mounted in the housing 11, being insulated therefrom by suitable insulating washers 28. The outer ends of the contact members are threaded for the attachment of suitable electrical lines which will be hereinafter described.

In Fig. 4 of the drawings there is shown, diagrammatically, an arrangement of electrical circuits in connection with which the device hereinbefore described is adapted to be used, although it will of course be understood that a multitude of other circuits may be devised for the use of the apparatus.

Referring now more particularly to Fig. 4, as there shown 31 and 32 are the main power leads, supplied with electrical current from any suitable source of supply. A wire 33 extends from lead 31 to one of the terminals of the motor 34 which operates the motion picture projection machine. The other terminal of the motor 34 is connected by wire 35 to contact 36 of a suitable relay 37. The other contact 38 of the relay 37 is connected by wire 39 to power lead 32. The contacts 36 and 38 of the relay 37 are adapted, when the coil thereof is energized, to be bridged by a contact bar 40.

A wire 41 extends from power lead 31 to one end of the coil 42 of the relay 37. The other end of the coil 42 of relay 37 is connected by wire 43 to one of the contact members 26 of one of the devices, illustrated in detail in Figs. 1, 2 and 3 of the drawings.

The other contact 27 of said device is connected by wire 44 to contact 26 of another of the devices illustrated in Figs. 1, 2 and 3 of the drawings. The other contact 27 thereof is connected by wire 45 to power lead 32. A manually operated switch 46 is included in line 45 so that this circuit may be opened by the operator when desired.

Another wire 47 extends from power lead 31 to one end of one of the coils 19 of one of the devices shown in Figs. 1, 2 and 3 of the drawings. The other end of said coil is connected by wire 48 to one end of the coil 19 of the other of said devices. The other end of the coil of said device is connected by wire 49 to power lead 32.

A plurality of switches 50 are interposed in the line 48, these switches being of a type well known and in common use in safety devices for motion picture machines, each having an arm 51 having a part at the end thereof which bears against an exposed portion of the passing film 14. The arrangement of the switches 50 is such that in the event of breakage of the film, one or more of said switches will be automatically opened to break the circuit of which the line 49 forms a part.

The operation of the device may now be explained. It will, of course, be understood that when no film is threaded between the magazines, the switches 50 will be opened, and consequently the coils 19 of the fire extinguishing devices will be de-energized. Plate 16 of each of said devices will bear against plate 15, by reason of the tension of the springs 20.

The circuit controlled by the contact bar 23 of said devices will be open whenever the coils 19 or either of them are de-energized, and consequently, the coil 42 of the relay 37 will be de-energized, so that the circuit in which the motor is included will also be open.

When it is desired to thread the film in the magazines, the plate 16 is retracted in any preferred manner, so that the film may be passed sidewise between the plates 15 and 16, the slot 21 being provided in one of the side walls of the housing 11 for this purpose. When the film is properly threaded through the machine, the switches 50 will be closed, whereupon the current will be permitted to pass to and energize the coils 19 of the fire extinguishing devices.

The contact bars 23 of each of the fire extinguishing devices will thus establish the circuit across the contact members 26 and 27 thereof, whereupon the current will be permitted to pass to and energize the coil 42 of the relay 37—that is, when the switch 46 is closed.

When the operator desires to start the motor, this is done by closing the switch 46, which thus completes the circuit through the coil 42 of the relay 37. When the coil 42 of relay 37 is thus energized, the contact bar 40 thereof completes the circuit across the contact members 36 and 38 of the relay 37, permitting the current to pass to and actuate the motor.

In the event of the breakage of the film, one or both of the switches 50 will be opened, thus breaking the circuit through the coils 19 of the fire extinguishing devices, and causing the plate 16 of each of said devices to grip the film between itself and the plate 15, so that in the event of the film becoming ignited between the magazines, the fire will not be permitted to pass within the magazines, but will be extinguished when it reaches the portion of the film which is clamped between the plates 15 and 16 of said devices.

Simultaneously with the gripping of the film between the plates 15 and 16 in each of the fire extinguishing devices, the contact bars 23 of said devices will be pulled away from the contact members 26 and 27, thus opening the circuit in which the coil 42 of the relay 37 is included, and de-energizing the same.

When the coil 42 of the relay 37 is thus de-energized, the contact bar 40 thereof will fall away from the contact members 36 and 38, thus opening the circuit in which the motor is included, and thereby stopping the further operation of the motor.

I claim:

1. In a motor driven motion picture machine, a pair of adjacent plates, one of said plates being movable with respect to the other, electro-magnetic means for separating said plates, said plates being adapted to grip the film therebetween when the separating means is de-energized, means for guiding the film between said plates, an electric circuit in which the plate separating means is included, switches for controlling said circuit, said switches having members adapted to engage the film whereby the switches will be closed only when the film is operating in its normal position and condition, a motor circuit in which the motor for actuating the machine is included, and a switch actuated by the plate separating means for controlling said motor circuit.

2. In a motor driven motion picture machine, a pair of adjacent plates, one of said plates being movable with respect to the other, electromagnetic means for separating said plates, said plates being adapted to grip the film therebetween when the separating means is de-energized, means for guiding the film between said plates, an electric circuit in which the plate separating means is included, switches for controlling said circuit, said switches having members adapted to engage the film whereby the swtches will be closed when the film is operating in its normal position and condition, a motor circuit in which the motor for actuating the machine is included and means actuated by the plate separating means for controlling said motor circuit.

3. In a motor driven motion picture machine, a pair of adjacent plates, one of said plates being movable with respect to the other, electromagnetic means for separating said plates, said plates being adapted to grip the film therebetween when the separating means is de-energized, means for guiding the film between said plates, an electric circuit in which the plate separating means is included, switches for controlling said circuit, said switches having members adapted to engage the film whereby the switches will be closed when the film is operating in its normal position and condition, a motor circuit in which the motor for actuating the machine is included, a relay for controlling said motor circuit, a circuit in which the coil of said relay is included, a switch for controlling said relay coil circuit, said last mentioned switch being actuated by the plate separating means whereby the relay coil circuit will be automatically opened when the means for separating said plates is de-energized.

4. In a motor driven motion picture machine, a housing mounted adjacent the film magazine, a pair of adjacent plates within said housing, one of said plates being movable with respect to the other, electro-magnetic means for separating said plates, said plates being adapted to grip the film therebetween when the separating means is de-energized, rollers for guiding the film between said plates free from contact therewith when the plates are separated, an electric circuit in which the plate separating means is included, switches for controlling said circuit, said switches having members adapted to engage the film whereby the switches will be closed when the film is operating in its normal position and condition, a motor circuit in which the motor for actuating the machine is included, and means actuated by the plate separating means for controlling said motor circuit.

5. In a motor driven motion picture machine, a housing mounted adjacent the film magazine, a pair of adjacent plates within said housing, one of said plates being movable with respect to the other, electro-magnetic means for separating said plates, said plates being adapted to grip the film therebetween when the separating means is de-energized, rollers for guiding the film between said plates free from contact therewith when the plates are separated, an electric circuit in which the plate separating means is included, switches for controlling said circuit, said switches having members adapted to engage the film whereby the switches will be closed when the film is operating in its normal position and condition, a motor circuit in which the motor for actuating the machine is included, and means for controlling said motor circuit including a switch actuated by the plate separating means whereby the motor circuit will be automatically opened when the means for separating said plates is de-energized.

6. In a motor driven motion picture machine, a housing mounted adjacent the film magazine, a pair of adjacent plates within said housing, one of said plates being movable with respect to the other, electro-magnetic means for separating said plates, said plates being adapted to grip the film therebetween when the separating means is de-energized, rollers for guiding the film between said plates free from contact therewith when the plates are separated, an electric circuit in which the plate separating means is included, switches for controlling said circuit, said switches having members adapted to engage the film whereby the switches will be closed when the film is operating in its normal position and condition, a motor circuit in which the motor for actuating the machine is included, a relay for controlling said motor circuit, a circuit in which the coil of said relay is included, a switch for controllng said relay coil circuit, said last mentioned switch being actuated by the plate separating means whereby the relay coil circuit will be automatically opened when the means for separating said plates is de-energized.

JAMES C. WOBENSMITH.